(12) United States Patent
Bhatnagar et al.

(10) Patent No.: US 7,919,418 B2
(45) Date of Patent: Apr. 5, 2011

(54) HIGH PERFORMANCE BALLISTIC COMPOSITES HAVING IMPROVED FLEXIBILITY AND METHOD OF MAKING THE SAME

(75) Inventors: Ashok Bhatnagar, Richmond, VA (US); Brian D. Arvidson, Chester, VA (US); David A. Hurst, Richmond, VA (US); Danelle F. Powers, Chesterfield, VA (US); David A. Steenkamer, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 935 days.

(21) Appl. No.: 11/823,570

(22) Filed: Jun. 28, 2007

(65) Prior Publication Data

US 2008/0064280 A1  Mar. 13, 2008

Related U.S. Application Data

(60) Provisional application No. 60/843,868, filed on Sep. 12, 2006.

(51) Int. Cl.
B32B 27/04 (2006.01)
B32B 5/26 (2006.01)

(52) U.S. Cl. ........ 442/135; 442/366; 442/381; 442/398; 428/219; 428/911; 264/640

(58) Field of Classification Search .......... 442/135, 442/366, 381, 398; 428/219, 911; 264/640
See application file for complete search history.

(56) References Cited

U.S. PATENT DOCUMENTS

| | | | |
|---|---|---|---|
| 4,137,394 A | 1/1979 | Meihuizen et al. | 528/100 |
| 4,356,138 A | 10/1982 | Kavesh et al. | 264/164 |
| 4,403,012 A | 9/1983 | Harpell et al. | 428/290 |
| 4,413,110 A | 11/1983 | Kavesh et al. | 526/348.1 |
| 4,457,985 A | 7/1984 | Harpell et al. | 428/224 |
| 4,501,856 A | 2/1985 | Harpell et al. | 525/423 |
| 4,543,286 A | 9/1985 | Harpell et al. | 428/288 |
| 4,563,392 A | 1/1986 | Harpell et al. | 428/394 |
| 4,584,347 A | 4/1986 | Harpell et al. | 525/119 |
| 4,613,535 A | 9/1986 | Harpell et al. | 428/113 |
| 4,623,574 A | 11/1986 | Harpell et al. | 428/113 |
| 4,650,710 A | 3/1987 | Harpell et al. | 428/263 |
| 4,681,792 A | 7/1987 | Harpell et al. | 428/102 |
| 4,737,401 A | 4/1988 | Harpell et al. | 428/252 |
| 4,737,402 A | 4/1988 | Harpell et al. | 442/187 |
| 4,748,064 A | 5/1988 | Harpell et al. | 428/113 |
| 4,820,568 A | 4/1989 | Harpell et al. | 428/113 |
| 4,883,700 A | 11/1989 | Harpell et al. | 428/113 |
| 4,916,000 A | 4/1990 | Li et al. | 428/105 |
| 4,953,234 A | 9/1990 | Li et al. | 2/412 |
| 5,006,390 A | 4/1991 | Kavesh et al. | 428/105 |
| 5,061,545 A | 10/1991 | Li et al. | 428/195 |
| 5,112,667 A | 5/1992 | Li et al. | 428/113 |
| 5,124,195 A | 6/1992 | Harpell et al. | 428/152 |
| 5,165,989 A | 11/1992 | Bhatnagar et al. | 428/245 |
| 5,167,876 A | 12/1992 | Lem et al. | 252/602 |
| 5,185,195 A | 2/1993 | Harpell et al. | 428/102 |
| 5,187,023 A | 2/1993 | Prevorsek et al. | 442/228 |
| 5,190,802 A | 3/1993 | Pilato | 428/111 |
| 5,196,252 A | 3/1993 | Harpell et al. | 428/102 |
| 5,330,820 A | 7/1994 | Li et al. | 428/105 |
| 5,471,906 A | 12/1995 | Bachner, Jr. et al. | 89/36.05 |
| 5,552,208 A | 9/1996 | Lin et al. | 428/113 |
| 5,567,498 A | 10/1996 | McCarter et al. | 428/113 |
| 5,587,230 A | 12/1996 | Lin et al. | 428/245 |
| 5,677,029 A | 10/1997 | Prevorsek et al. | 428/113 |
| 5,690,526 A | 11/1997 | Lin et al. | 442/59 |
| 5,702,657 A | 12/1997 | Yoshida et al. | 264/112 |
| 6,219,842 B1 | 4/2001 | Bachner, Jr. | 2/2.5 |
| 2004/0092183 A1 | 5/2004 | Geva et al. | |

FOREIGN PATENT DOCUMENTS

| | | |
|---|---|---|
| WO | WO03089235 | 10/2003 |
| WO | WO2004033196 | 4/2004 |

*Primary Examiner* — Norca L Torres-Velazquez
(74) *Attorney, Agent, or Firm* — Erika S. Wilson

(57) ABSTRACT

A composite material which has excellent ballistic performance and has improved flexibility. Surprisingly, it has been found that a combination of poly(alpha-olefin) fiber and matrix resin provides these desirable product features. The resin matrix is a block copolymer of a conjugated diene and a vinyl aromatic monomer, preferably a styrene-isoprene-styrene block copolymer, that is applied as an aqueous composition. The fiber has a tenacity of at least about 35 g/d and a tensile modulus of at least about 1200 g/d. The composite has a total density equal to or less than about 100 $g/m^2$ and a stiffness of less than about 2.5 pounds (1.14 kg) for a two layer structure of the composite, and a total areal density equal to or less than about 190 $g/m^2$ and a stiffness of less than about 3.0 pounds (1.36 kg) for a four layer structure of the composite. The Peel Strength for a two layer structure of less than about 1.0 pounds (0.45 kg) for a two layer structure of the composite, and less than about 0.7 pounds (0.32 kg) for a four layer structure of the composite. The process of this invention permits fabrication of these desirable products in a cost-effective manner. Body armor made from the composite has improved flexibility and excellent ballistic characteristics.

33 Claims, No Drawings

HIGH PERFORMANCE BALLISTIC COMPOSITES HAVING IMPROVED FLEXIBILITY AND METHOD OF MAKING THE SAME

CROSS-REFERENCE TO RELATED APPLICATIONS

This application claims the benefit of U.S. provisional application Ser. No. 60/843,868, filed Sep. 12, 2006.

BACKGROUND OF THE INVENTION

1. Field of the Invention

This invention relates to high performance ballistic composites that have improved flexibility, and to a process for making the same.

2. Description of the Related Art

Ballistic resistant products for vests and the like are known in the art. Many of these products are based on high tenacity fibers, such as extended chain polyethylene fibers. Body armor, such as bullet-resistant vests, may be formed from rigid composites and/or flexible composites.

Rigid body armor provides good ballistic resistance, but is also very stiff and relatively bulky. As a result, in general, rigid body armor garments (e.g., vests) are usually less comfortable to wear than flexible body armor garments. Rigid body armor is also referred to as "hard" armor, which has been defined in the art (see, for example, U.S. Pat. No. 5,690,526) to mean an article, such as a helmet or panels for military vehicles, which has sufficient mechanical strength so that it maintains structural rigidity when subjected to a significant amount of stress and is capable of being free-standing without collapsing. In contrast to such rigid or hard armor, is flexible or "soft" armor which does not have the attributes associated with the hard armor previously mentioned. Although flexible body armor based on high tenacity fibers has excellent service experience, its ballistic performance is generally not as high as that of hard armor. If higher ballistic performance is desired in flexible armor, generally speaking the flexibility of such armor is decreased.

Various attempts have been made to produce flexible ballistic composites, such as providing permanent creases in a fibrous web as is disclosed in U.S. Pat. No. 5,124,195 to Harpell et al., and providing textured surfaces as is described in U.S. Pat. No. 5,567,498 to McCarter et al.

It would be desirable to provide a flexible ballistic composite material which has improved flexibility and also improved ballistic performance. It would also be desirable to provide an armor product, such as body armor, based on such a material which likewise has improved flexibility and ballistic performance. Such armor desirably would be comfortable to wear and not costly to manufacture.

SUMMARY OF THE INVENTION

In accordance with this invention, there is provided a flexible ballistic resistant composite material having improved flexibility, the composite material comprising a plurality of non-woven fibrous layers, the fibrous layers, the fibrous layers comprising a network of high tenacity poly(alpha-olefin) fibers having a tenacity of at least about 35 g/d and a tensile modulus of at least about 1200 g/d, the fibers being in a matrix comprising a block copolymer of a conjugated diene and a vinyl aromatic monomer deposited on the fibers as an aqueous composition, the composite having a total areal density equal to or less than about 100 g/m² and a stiffness of less than about 2.5 pounds (1.14 kg) for a two layer structure of the composite, and a total areal density equal to or less than about 190 g/m² and a stiffness of less than about 3.0 pounds (1.36 kg) for a four layer structure of the composite.

Also in accordance with this invention, there is provided a flexible ballistic resistant composite material having improved flexibility, the composite material comprising a plurality of non-woven fibrous layers, the fibrous layers comprising a network of high tenacity poly(alpha-olefin) fibers having a tenacity of at least about 35 g/d and a tensile modulus of at least about 1200 g/d, the fibers being in a matrix comprising a block copolymer of a conjugated diene and a vinyl aromatic monomer deposited on the fibers as an aqueous composition, the composite having a total areal density equal to or less than about 100 g/m² and a stiffness of less than about 2.5 pounds (1.14 kg) for a two layer structure of the composite, and a total areal density equal to or less than about 190 g/m² and a stiffness of less than about 3.0 pounds (1.36 kg) for a four layer structure of the composite, and wherein the composite has a Peel Strength of less than about 1.0 pounds (0.45 kg) for a two layer structure of the composite, and less than about 0.7 pounds (0.32 kg) for a four layer structure of the composite.

The term "Peel Strength" is defined below.

Further in accordance with this invention, there is provided a flexible ballistic resistant composite material having improved flexibility, the composite material comprising a plurality of non-woven fibrous layers, the fibrous layers comprising a network of high tenacity poly(alpha-olefin) fibers having a tenacity of at least about 35 g/d and a tensile modulus of at least about 1200 g/d, the fibers being in a matrix comprising a block-copolymer of a conjugated diene and a vinyl aromatic monomer deposited on the fibers as an aqueous composition, the composite having a total areal density equal to or less than about 100 g/m² and a stiffness of less than about 2.5 pounds (1.14 kg) for a two layer structure of the composite, and a total areal density equal to or less than about 190 g/m² and a stiffness of less than about 3.0 pounds (1.36 kg) for a four layer structure of the composite, whereby when assembled together a plurality of the composites meets at least one of the following ballistic criteria:

(a) for a total weight of 0.75 pounds per square foot (3.68 kg/m²) when impacted with a 9 mm full metal jacket bullet:
  (i) for a plurality of the composites comprising two layer structures of said composite, a V50 of at least about 1600 fps (488 mps), and
  (ii) for a plurality of the composites comprising four layer structures of the composite, a V50 of at least about 1700 fps (519 mps);

(b) for a total weight of 0.75 pounds per square foot (3.68 kg/m²) when impacted with a 44 magnum bullet:
  (iii) for a plurality of the composites comprising two layer structures of the composite, a V50 of at least about 1500 fps (458 mps), and
  (iv) for a plurality of the composites comprising four layer structures of the composite, a V50 of at least about 1550 fps (473 mps); and (c) for a total weight of 1.00 pounds per square foot (4.90 kg/m²) when impacted with a 17 grain Fragment Simulating Projectile meeting the specifications of MIL-P-46593A (ORD):
  (v) for a plurality of the composites comprising two layer structures of the composite, a V50 of at least about 1825 fps (556 mps), and
  (vi) for a plurality of the composites comprising four layer structures of the composite, a V50 of at least about 1875 fps (572 mps).

In further accordance with this invention, there is provided a flexible ballistic resistant armor product comprising a plurality of layers of a flexible composite material, the composite material comprising a network of high tenacity poly(alpha-olefin) fibers having a tenacity of at least about 35 g/d and a tensile modulus of at least about 1200 g/d, the fibers being in a matrix comprising a block copolymer of a conjugated diene and a vinyl aromatic monomer deposited on the fibers as an aqueous composition, the composite having a total areal density equal to or less than about 100 g/m² and a stiffness of less than about 2.5 pounds (1.14 kg) for a two layer structure of the composite, and a total areal density equal to or less than about 190 g/m² and a stiffness of less than about 3.0 pounds (1.36 kg) for a four layer structure of the composite.

In still further accordance with this invention, there is provided a method for the manufacture of a flexible ballistic resistant composite material that has improved flexibility, the method comprising providing a first non-woven fibrous layer comprising a network of high tenacity poly(alpha-olefin) fibers having a tenacity of at least about 35 g/d and a tensile modulus of at least about 1200 g/d; coating the first fibrous layer with an aqueous composition comprising a block copolymer of a conjugated diene and a vinyl aromatic monomer; providing a second non-woven fibrous layer comprising a network of the high tenacity poly(alpha-olefin) fibers; coating the second fibrous layer with an aqueous composition comprising a block copolymer of a conjugated diene and vinyl aromatic monomers; evaporating water from the first and second fibrous layers, and consolidating the first and second fibrous layers to form a composite material having a total areal density equal to or less than about 100 g/m² and a stiffness of less than about 2.5 pounds (1.14 kg) for a two layer structure of the composite, and a total areal density equal to or less than about 190 g/m² and a stiffness of less than about 3.0 pounds (1.36 kg) for a four layer structure of the composite.

Most preferably, the block copolymer is an elastomeric unsaturated block copolymer of styrene-isoprene-styrene.

The flexible composite material preferably also comprises flexible films on one or both sides of each two ply structure or four ply structure. The adjacent layers of the composite material may be arranged such that the directions of the fibers in adjacent layers are rotated about 90°, or other desired orientation, to one another.

The present invention provides a composite material which has excellent ballistic performance and yet has improved flexibility. Surprisingly, it has been found that the combination of fiber and matrix resin employed herein provides these desirable product features which were not heretofore attainable. The process of this invention permits fabrication of these desirable products in a cost-effective manner. In addition, body armor made from the composite has improved flexibility and is more comfortable to wear.

DETAILED DESCRIPTION OF THE INVENTION

The present invention comprises a flexible composite which is ballistic resistant. These composites are particularly useful in ballistic resistant flexible armor articles, such as body armor, blankets, curtains and the like.

The composite comprises high tenacity fibers that are in an elastomeric resin matrix. The composite is formed from at least two layers of the high tenacity poly(alpha-olefin) fibers. For the purposes of the present invention, a fiber is an elongate body the length dimension of which is much greater than the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

The fibers useful in this invention are formed from ultra-high molecular weight poly(alpha-olefins). These polymers and the resultant fibers and yarn include polyethylene, polypropylene, poly(butene-1), poly(4-methyl-pentene-1), their copolymers, blends and adducts. For the purposes of the invention, an ultra-high molecular weight poly(alpha-olefin) is defined as one having an intrinsic viscosity when measured in decalin at 135° C. of from about 5 to about 45 dl/g.

The fibers of this invention may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

As used herein, the term "high tenacity fibers" means fibers which have a tenacity equal to or greater than about 35 g/d. These fibers preferably have initial tensile moduli of at least about 1200 g/d and an ultimate elongation of at least about 2.5%, as measured by ASTM D2256. Preferred fibers are those having a tenacity equal to or greater than about 36 g/d, a tensile modulus equal to or greater than about 1250 g/d and an ultimate elongation of at least about 2.9%. Particularly preferred fibers are those having a tenacity of at least 36 g/d, a tensile modulus of at least 1285 g/d, and an elongation of at least 3.0%. As used herein, the terms "initial tensile modulus", "tensile modulus" and "modulus" mean the modulus of elasticity as measured by ASTM 2256 for a yarn and by ASTM D638 for a matrix material.

The network of fibers used in the composite of the present invention is in the form of a non-woven fabric formed from the aforementioned high tenacity fibers. A particularly preferred configuration of the fibers is in a network wherein the fibers are unidirectionally aligned so that they are substantially parallel to each other along a common fiber direction. Preferably, at least about 50% by weight of the fibers in the non-woven fabric are such high tenacity fibers, and more preferably at least about 75% by weight of the fibers in the fabric are the high tenacity fibers. Most preferably, substantially all of the fibers in the fabric are the high tenacity fibers described above.

The high strength fibers particularly useful in the yarns and fabrics of the invention are preferably highly oriented high molecular weight high modulus polyethylene fibers (also known as extended chain polyethylene) and highly oriented high molecular weight high modulus polypropylene fibers. Most preferred are extended chain polyethylene fibers.

The yarns and fabrics of the invention may be comprised of one or more different high strength fibers. Preferably, however, the yarns and fabrics of the invention are formed from the same high strength fiber. The yarns may be in essentially parallel alignment, or the yarns may be twisted, over-wrapped or entangled.

The yarns may be of any suitable denier. For example, the yarns may have a denier of from about 50 to about 3000 denier, more preferably from about 200 to about 3000 denier, still more preferably from about 650 to about 1700 denier, and most preferably from about 1100 to about 1600 denier.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-I-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers are preferred and are sold under the trademark SPECTRA® by Honeywell International Inc. of Morristown, N.J., USA.

Depending upon the formation technique, the draw ratio and temperatures, and other conditions, a variety of properties can be imparted to these fibers. The highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

A particularly preferred fiber is one that has the following properties: tenacity of 36.6 g/d, a tensile modulus of 1293 g/d, and an ultimate elongation of 3.03 percent. Also preferred is a yarn having a denier of 1332 and 240 filaments.

The high strength fabric of this invention is in the form of a non-woven fabric, such as plies of unidirectionally oriented fibers, or fibers which are felted in a random orientation and which are embedded in a suitable resin matrix. Fabrics formed from unidirectionally oriented fibers typically have one layer of fibers which extends in one direction and a second layer of fibers which extends in a direction 90° from the fibers in the first layer. Where the individual plies are unidirectionally oriented fibers, the successive plies are preferably rotated relative to one another, for example at angles of 0°/90°, 0°/90°/0°/90°, or 0°/45°/90°/45°/0° or at other angles.

It is convenient to characterize the geometries of the composites of the invention by the geometries of the fibers. One such suitable arrangement is a fibrous layer in which the fibers are aligned parallel to one another along a common fiber direction (referred to as a "unidirectionally aligned fiber network"). Successive layers of such unidirectionally aligned fibers can be rotated with respect to the previous layer. Preferably, the fibrous layers of the composite are cross-plied, that is, with the fiber direction of the unidirectional fibers of each network layer rotated with respect to the fiber direction of the unidirectional fibers of the adjacent layers. An example is a five layer article with the second, third, fourth and fifth layers rotated +45°, −45°, 90° and 0° with respect to the first layer. A preferred example includes two layers with a 0°/90° lay-up. Such rotated unidirectional alignments are described, for example, in U.S. Pat. Nos. 4,457,985; 4,748,064; 4,916,000; 4,403,012; 4,623,574; and 4,737,402.

In general, the fibrous layers of the invention are preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. The fiber networks can be constructed via a variety of methods. In the preferred case of unidirectionally aligned fiber networks, yarn bundles of the high tenacity filaments are supplied from a creel and led through guides into a collimating comb and one or more spreader bars prior to coating with the matrix material. The collimating comb aligns the filaments coplanarly and in a substantially unidirectional fashion.

The method of this invention includes initially forming the fiber network layer, preferably a unidirectional network as described above, applying a solution, dispersion or emulsion of the matrix composition onto the fiber network layer, and then drying the matrix-coated fiber network layer. The solution, dispersion or emulsion is an aqueous product of the elastomeric matrix resin, which may be sprayed onto the filaments. Alternatively, the filament structure may be coated with the aqueous solution, dispersion or emulsion by dipping or by means of a roll coater or the like. After coating, the coated fibrous layer may then be passed through an oven for drying in which the coated fiber network layer ("unitape") is subjected to sufficient heat to evaporate the water in the matrix composition. The coated fibrous network may then be placed on a carrier web, which can be a paper or a film substrate, or the fibers may initially be placed on a carrier web before coating with the matrix resin. The substrate and the consolidated unitape can then be wound into a continuous roll in a known manner.

The consolidated unitape can be cut into discrete sheets and laid up into a stack for formation into the end use composite. As mentioned previously, the most preferred composite is one wherein the fiber network of each layer is unidirectionally aligned and oriented so that the fiber directions in successive layers are in a 0°/90° orientation.

The fibers in each adjacent layer may be the same or different, although it is preferred that the fibers in each two adjacent layers of the composite be the same.

The resin matrix for the fibers in the fibrous layers is preferably an elastomeric unsaturated block copolymer of styrene-isoprene-styrene. A particularly useful water based dispersion is a dispersion of Kraton® D1107 styrene-isoprene-styrene elastomer which preferably contains less than about 0.5 weight percent retained organic solvent. The dispersion preferably contains a wood rosin derivative as a resin modifier, surfactants and antioxidants. Typical total solids content of the such dispersion may range from about 30 to about 60 weight percent, more preferably from about 35 to about 50 weight percent, and most preferably from about 40 to about 45 weight percent. The solids content may be diluted if desired by the addition of water, or it may be increased if desired by the addition of viscosity modifiers and the like. A typical dispersion as sold has a viscosity of about 400 cps as measured at 77° F. (25° C.), and has a particle size ranging from 1-3μ. Conventional additives such as fillers and the like may be included in the elastomeric composition.

Other block copolymers of conjugated dienes and vinyl aromatic monomers may alternatively be employed as the matrix resin. Butadiene and isoprene are preferred conjugated diene elastomers. Styrene, vinyl toluene and t-butyl styrene are preferred vinyl aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer.

Such water based elastomeric materials are known in the art and are commercially available.

The amount of the water based composition which is deposited on the fibers in the fibrous networks of the invention is chosen so as to achieve a desired level of resin content in the fiber network. The amount of the composition used of course depends upon the solids content and the percentage of the elastomeric material in the solids. This amount is desirably chosen such that the proportion of the resin matrix material to fiber in the composite layers is lower than heretofore employed in commercial products. Preferably, the resin, on a solids basis, preferably forms about 7 to about 20 percent by weight, more preferably from about 13 to about 17 percent by weight, and most preferably about 15 percent by weight, of each composite layer.

The composite materials of this invention may be formed from individual lamina by consolidating under heat and pressure, such as, for example, at temperatures ranging from about 75 to about 260° F. (24 to 127° C.), pressures of from about 1 to about 250 psi (6.9 to 1725 kPa) and for a time of from about 1 to about 30 minutes.

The number of layers in the composite material depends on the particular end use. Most preferably, each composite is formed from two fibrous layers which are oriented 90° with respect to each other and have been consolidated into a single structure. In an alternate embodiment, the composite may be formed from two sets of such single structures, such that a total of four layers of fibers are employed; in this case, two of the two-ply consolidated structures are consolidated with one another.

One or more plastic films are desirably included in the composite to permit different composite layers to slide over each other for ease of forming into a body shape and ease of wearing. These plastic films may typically be adhered to one or both surfaces of each composite. Any suitable plastic film may be employed, with preferred films being formed from polyolefins. Examples of such films are linear low density polyethylene (LLDPE) films, ultrahigh molecular weight polyethylene (UHMWPE) films, polyester films, nylon films, polycarbonate films and the like. These films may be of any desirable thickness. Typical thicknesses range from about 0.1 to about 1.2 mils (2.5 to 30 μm), more preferably from about 0.2 to about 1 mil (5 to 25 μm), and most preferably from about 0.25 to about 0.5 mils (6.3 to 12.7 μm). Most preferred are films of LLDPE.

One preferred construction of this invention is a two ply laminate which is cross-plied at 0°/90° and has films of LLDPE on both of its exterior surfaces. A second preferred construction of this invention is a four ply laminate which is the combination of two layers of the two ply laminate previously mentioned. This four ply laminate also has LLDPE films on both of its exterior surfaces.

The number of layers of composite used in articles formed therefrom vary depending upon the ultimate use of the article. Preferably, the composites of this invention form the outer facing layers of the body armor, such as a vest, but alternatively they may form the inner layers. The number of layers of the two-ply or four-ply construction is chosen to provide a desired areal density in the final product, considering the desired performance, weight and cost. For example, in body armor vests in order to achieve a desired approximate 1.0 pound per square foot areal density (4.90 kg/m²), in one typical construction there may be a total of about 51 layers of the two-ply construction or about 27 layers of the four-ply construction. In another typical embodiment in body armor vests, in order to achieve a desired approximate 0.75 pound per square foot areal density (3.68 kg/m²), there may be a total of about 39 layers of the two-ply construction or about 21 layers of the four-ply construction of this invention. The desired areal density of the vest or other ballistic resistant article may be of any desired amount, such as from about 0.5 to about 1.2 pounds per square foot (2.45 to 5.88 kg/m²), more preferably from about 0.75 to about 1.1 pounds per square foot (3.68 to 5.29 kg/m²). In general, the number of layers in a ballistic article of the two-ply construction preferably ranges from about 25 to about 65 layers, more preferably from about 35 to about 55 layers; and the number of layers in a ballistic article of the four-ply construction preferably ranges from about 13 to about 33 layers, more preferably from about 20 to about 30 layers. It should be recognized that the number of layers refers to only the layers of the above-described composite constructions, and more preferably are for composites wherein the fibers are extended chain polyethylene fibers.

It should be pointed out that other layers may be present together with the composite of this invention in an armor product or the like. These additional layers may be woven, knitted or non-woven fabrics and preferably also formed from high tenacity fibers, which fibers may also be high tenacity poly(alpha-olefin) fibers, or may be other high tenacity fibers such as aramid, liquid crystal copolyester, PBO fibers, etc.

The total areal density of the composites of this invention is preferably equal to or less than about 100 g/m², and more preferably from about 75 to about 100 g/m², for a two ply structure of the composite material of this invention. Most preferably the total areal density for such structure is about 97 g/m². For a four ply structure of the composite material of this invention, the total areal density is preferably equal to or less than about 190 g/m², and more preferably from about 140 to about 190 g/m². Most preferably, the total areal density for a four ply structure of the composite is about 180 g/m². As used herein, the total areal density of the composite is defined as the weight per unit area of the multi-layer material forming the composite of this invention (together with plastic films if utilized). Due to the nature of the fiber and resin material employed in the construction of the layers of the composite of this invention, such comparatively low fiber areal densities can be achieved. As such, there is available more fibers per weight to provide the desired ballistic properties.

As noted above, the high tenacity fibers of each layer are coated with the matrix composition and then the matrix composition/fibers combination is consolidated. By "consolidating" is meant that the matrix material and the fibrous layer are combined into a single unitary layer. Consolidation can occur via drying, cooling, heating, pressure or a combination thereof.

Various constructions are known for fiber-reinforced composites used in impact and ballistic resistant articles. These composites display varying degrees of resistance to penetration by high speed impact from projectiles such as bullets, shrapnel and fragments, and the like. For example, U.S. Pat. Nos. 6,219,842; 5,677,029, 5,587,230; 5,552,208; 5,471,906; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012; PCT Publication No. WO 91/12136 all describe ballistic resistant composites which include high strength fibers made from high molecular weight polyethylene.

In one embodiment of the invention, a vest or other body armor or other article is formed in a conventional manner from a plurality of layers of the composite material. These layers preferably are not laminated together but may be stitched together to avoid slippage of the individual plies with respect to each other. For example, the layers may be tack stitched at each corner. Alternatively, the layers may be encased as a whole in a pocket or other covering.

The flexible ballistic armor of this invention preferably is characterized in having a V50 of at least about 1600 fps (488 mps), preferably at least about 1650 fps (503 mps) when impacted with a 9 mm full metal jacket bullet, for a construction based on a two-ply composite, when tested in accordance with MIL-STD-662E. Also for a construction based on a two-ply composite, the composite of this invention is characterized in a V50 of at least about 1500 fps (458 mps), preferably at least about 1525 fps (465 mps) when impacted with a 44 magnum bullet, when tested in accordance with MIL-STD-662E. These properties are determined using a shoot pack of 18×18 inches (45.7×45.7 cm) having a weight of 0.75 pounds per square foot (3.68 kg/m²).

As is known in the art, the V50 velocity is that velocity for which the projectile has a 50% probability of penetration.

Similarly, the composites of this invention based on four-ply construction are characterized in ballistic performance of a V50 of at least about 1700 fps (519 mps) when impacted with a 9 mm full metal jacket bullet, more preferably a V50 of at least about 1725 fps (526 mps) when tested in accordance with MIL-STD-662E. The four-ply laminates are also characterized in a V50 of at least about 1550 fps (473 mps), preferably at least about 1575 fps (480 mps) when impacted with a 44 magnum bullet when tested in accordance with MIL-STD-662E. These properties are determined on the same shoot pack as with the 9 mm full metal jacket bullet described above.

Furthermore, the flexible ballistic armor of this invention preferably is characterized in having a V50 of at least about 1825 fps (556 mps), more preferably at least about 1875 fps (572 mps) when impacted with a 17 grain Fragment Simulating Projectile (FSP) per MIL-STD-662E, for a construction based on a two-ply composite. The fragment was as specified by MIL-P-46593A (ORD), caliber=.22. The four-ply laminates preferably are also characterized in a V50 of at least about 1875 fps (572 mps), more preferably at least about 1900 fps (579 mps) when impacted with the same 17 grain FSP. These properties are determined using a shoot pack of 18×18 inches (45.7×45.7 cm) having a weight of 1.00 pounds per square foot (4.90 kg/m²).

As mentioned above, the composites of this invention are further characterized in having a stiffness of less than about 2.5 pounds (1.14 kg), preferably less than about 2.0 pounds (0.91 kg), for the two-ply composite. Stiffness is measured in accordance with ASTM D4032, and the lower the stiffness the higher is the flexibility of a composite. For the four-ply composite of this invention, the stiffness is less than about 3.0 pounds (1.36 kg), and preferably less than about 2.8 pounds (1.27 kg).

Additionally, the composites of this invention are characterized in relatively low peel strengths, as measured by a modified version of ASTM D3330. The peel strength as described herein is referred to as Peel Strength in the following description and in the claims.

The Peel Strength test is conducted to measure the Peel Strength between the layers of two or more materials bonded together. For testing the Peel Strength between layers of cross-plied material, with or without lamination between plastic films, three samples per material are cut from the sheet of cross-plied material. Care is taken to follow the fiber direction during cutting the sample. The sample size is 2 inches wide×11 inches long (5×28 cm).

To determine the bond strength of a 2 ply material or the outer layers of a 4 ply material (what is referred to as the 1-2 bond and the 3-4 bond) a strip 1 inch (2.5 cm) wide of the 2 inch (5 cm) wide sample is peeled down the center, leaving 0.5 inch (1.25 cm) on each edge of cross-directional fibers. This is necessary to hold the other side of the material since that side is the cross-directional fiber side and does not have the strength to be peeled without some of the machine directional fibers being present in the clamp together with the cross-directional fibers.

Each test sample is peeled up to 2 inch (5 cm) length so that the sample can be gripped in an Instron testing machine. Once the sample is firmly clamped into the grips of the machine, the test is started to peel the sample at a cross-head speed of 10 inches (25.4 cm)/min. A 5 inch (12.7 cm) length of the sample is peeled in the machine. The peel force is recorded and the average peak peel force (of the top 5 peaks) and the average peel force are calculated.

Three identical peels are tested for each interface of each sample and the average peel strength is reported for each interface of each sample. There is one interface tested for a two ply sample (the 0°/90° interface) and 3 interfaces tested for a four ply sample (the 0°/90°, 90°/0° and 0°/90° interfaces).

The procedure for the 4 ply material is the same, except to measure the 2-3 layer bond Peel Strength the sample size is cut to 1 inch wide×11 inches (2.5×28 cm) long and one half of the thickness of the sample (film and 0°/90°) is peeled from the other half of the sample (film and 0°/90°), since both halves have machine direction fibers to provide the strength to the strip for peeling.

For the two-ply composite of this invention, preferably the Peel Strength is less than about 1.0 pounds (0.45 kg), and more preferably less than about 0.9 pounds (0.41 kg). The Peel Strength for a two ply composite is measured between the two plies (e.g., between the 0° ply and the 90° ply in a cross-plied construction). For the four-ply composite of this invention, the Peel Strength is preferably less than about 0.7 pounds (0.32 kg), and more preferably less than about 0.6 pounds (0.27 kg). The Peel Strength for a four ply composite is measured between the second and third layers, (e.g. between the first 0°/90° ply and the second 0°/90° ply in a 0°/90°/0°/90° construction).

Compared with existing commercial products based on poly (alpha-olefin) fibers, the ballistic composites of this invention have lower fiber areal density, higher V50 ballistic properties, and lower stiffness (higher flexibility). The composites of this invention are further characterized in having lower Peel Strengths than conventional poly(alpha-olefin) ballistic composites.

As mentioned above, the flexible or soft armor of this invention is in contrast to rigid or hard armor. The flexible materials and armor of this invention do not retain their shape when subjected to a significant amount of stress and are incapable of being free-standing without collapsing.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percentages are by weight, unless otherwise stated.

EXAMPLES

Examples 1 and 2

A two-ply non-woven composite was formed from layers of extended chain Spectra® 1000 polyethylene fiber from Honeywell International Inc. The fiber had a tenacity of 36.6 g/d, a tensile modulus of 1293 g/d and an ultimate elongation of 3.03 percent. The yarn denier was 1332 (240 filaments). Uni-directional preimpregnated tapes ('unitapes") of these fibers were prepared and a matrix resin was coated thereon. The matrix resin was Prinlin® B7137HV (from Pierce & Stevens Corp.), which is a water based dispersion of Kraton® D1107 styrene-isoprene-styrene resin block copolymer. This product is described by its manufacturer as comprising, by weight, 68.7% Kraton® D1107, 22.7% of a wood rosin derivative as a resin modifier, 3.9% of a nonionic surfactant, 2.1% of an anionic surfactant, 2.3% of an antioxidant and 0.3% of sodium hydroxide, and a viscosity at 77° F. (25° C.) of 400 cps. The amount of styrene in the polymer is described as 14% by weight, and the particle size is described as 1-3μ. Following coating, the water is evaporated from composition and the fiber network was wound up on a roll. Two continuous rolls of unidirectional fiber prepregs were prepared in this manner. Two such unitapes were cross-plied at 90° and consolidated under heat and pressure to create a laminate with two identical polyethylene fiber lamina. The resulting structure contained 15 weight percent of the elastomeric resin. Two such two-ply consolidated structures were then cross-plied once again at 90°, and consolidated under heat and pressure. The resulting structure was a 4-ply polyethylene fiber composite.

Both the two-ply and the four-ply consolidated layers (Examples 1 and 2, respectively) were sandwiched between two LLDPE films (thickness of approximately 0.35 mil (8.9 μm)) under heat and pressure. Samples of these materials measuring 18×18 in. (45.7×45.7 cm) were tested for their ballistic properties and their flexibility properties. The Example 1 samples had a thickness of 0.005 inch (0.127 mm) and the Example 2 samples had a thickness of 0.009 inch (0.229 mm). Ballistic testing for the 9 mm FMJ bullets and 44 Magnum bullets were conducted as per MIL-STD-662E, and the backing of the shoot pack was clay. Ballistic testing for the 17 grain FSP was conducted as per MIL-STD-662E, and the backing of the shoot pack was air. For the 9 mm and 44 Magnum ballistic tests, the total areal density was 0.75 pounds per square foot (3.68 kg/m$^2$). As such, the shoot packs included 39 layers of the 2 ply composite (including films) and the 21 layers of the 4 ply composite (including films). For the 17 grain FSP ballistic tests, the total areal density was 1.00 pounds per square foot (4.90 kg/m$^2$). As such, the shoot packs included 51 layers of the 2 ply composite (including films) and 27 layers of the 4 ply composite (including films).

The results are shown in Table 1 for the different ballistic tests.

Examples 3 and 4

Comparative

For comparative purposes, samples of commercially available polyethylene fiber based composites were tested for their properties. The results are also shown in Table 1, below. Example 3 was Spectra Shield® Plus LCR from Honeywell International Inc. (having a thickness of 0.006 inch (0.152 mm)), which is a two-ply cross-plied laminate of Spectra® 1000 fibers (1100 denier), with a Kraton® D1107 styrene-isoprene-styrene resin applied from an organic solvent, and having a resin content of about 20% by weight. Example 4 was Dyneema® SB31 from DSM (having a thickness of 0.006 inch (0.152 mm)), which is a two-ply cross-plied laminate of polyethylene fibers, with a Kraton® D1107 styrene-isoprene-styrene resin, and having a resin content of about 16±2% by weight.

TABLE 1

| Example | Total Areal Density (g/m$^2$) | 9 MM FMJ[1] V50, fps (mps) | 44 Magnum[1] V50, fps (mps) | 17 Grain FSP[2] V50, fps (mps) | Stiffness, lbs (kg) | Peel Strength, lbs (kg) |
|---|---|---|---|---|---|---|
| 1 (two ply) | 97 | 1697 (517.6) | 1530 (466.7) | 1951 (595.1) | 1.9 (0.86) | 0.845 (0.384) |
| 2 (four ply) | 180 | 1758 (536.2) | 1599 (487.7) | 1956 (596.6) | 2.7 (1.23) | 0.100 (0.045) |

TABLE 1-continued

| Example | Total Areal Density (g/m²) | 9 MM FMJ[1] V50, fps (mps) | 44 Magnum[1] V50, fps (mps) | 17 Grain FSP[2] V50, fps (mps) | Stiffness, lbs (kg) | Peel Strength, lbs (kg) |
|---|---|---|---|---|---|---|
| 3 (comp.) | 118 | 1560 (475.8) | 1421 (433.4) | 1756 (535.6) | 3.0 (1.36) | 2.35 (1.066) |
| 4 (comp.) | 132 | 1642 (500.8) | 1533 (467.6) | — | 3.0 (1.36) | 3.91 (1.774) |

[1]= weight of shoot pack 0.75 psf (3.68 kg/m²)
[2]= weight of shoot pack = 1.00 psf (4.90 kg/m²)

It can be seen that the two ply and four ply ballistic materials not only have the highest ballistic resistance against a 9 mm FMJ hand-gun bullet, but also have either the same or higher ballistic resistance against a 44 magnum highly deformable bullet. This is surprising for a ballistic material that has excellent flexibility.

Also, surprisingly, the composite material of this invention has excellent fragment resistance against 17 grain, 22 caliber Fragment Simulating Projectiles.

The two ply product also has the highest flexibility compared with the comparison products. Higher flexibility is very desirable because it provides comfort in a ballistic vest. Such vests may be worn by military personnel or law enforcement officers during their long hours at duty.

Accordingly, it can be seen that the present invention provides a ballistic composite and articles formed therefrom that have improved flexibility and excellent ballistic resistance. The present invention also provides a process for making the improved flexible composites.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A flexible ballistic resistant composite material having improved flexibility, said composite material comprising a plurality of non-woven fibrous layers, said fibrous layers comprising a network of high tenacity poly(alpha-olefin) fibers having a tenacity of at least about 35 g/d and a tensile modulus of at least about 1200 g/d, said fibers being in a matrix comprising a block copolymer of a conjugated diene and a vinyl aromatic monomer deposited on said fibers as an aqueous composition, said composite having a total areal density equal to or less than about 100 g/m² and a stiffness of less than about 2.5 pounds (1.14 kg) for a two layer structure of said composite, and a total areal density equal to or less than about 190 g/m² and a stiffness of less than about 3.0 pounds (1.36 kg) for a four layer structure of said composite.

2. The composite material of claim 1, wherein adjacent fibrous layers are cross-plied with respect to one another.

3. The composite material of claim 1, wherein adjacent fibrous layers are cross-plied at about 90° with respect to one another.

4. The composite material of claim 1, wherein said fibers in at least one of said fibrous layers comprise extended chain polyethylene fibers.

5. The composite material of claim 1, wherein said block copolymer comprises a styrene-isoprene-styrene block copolymer.

6. The composite material of claim 1, further comprising at least one plastic film in contact with at least one of said fibrous layers.

7. The composite material of claim 6, wherein said plastic film comprises a linear low density polyethylene film.

8. The composite material of claim 1, further comprising at a plastic film in contact with each of said fibrous layers, such that the fibrous layers are positioned between two plastic films.

9. The composite material of claim 1, wherein said composite material comprises two layers of said fibrous material.

10. The composite material of claim 1, wherein said composite material comprises four layers of said fibrous material.

11. The composite material of claim 1, wherein said fibers in said non-woven fibrous layers are arranged unidirectionally in each layer.

12. The composite material of claim 1, wherein said copolymer is present in an amount of from about 7 to about 20 percent by weight of the composite.

13. The composite material of claim 1, wherein said copolymer is present in an amount of from about 13 to about 17 percent by weight of the composite.

14. The composite material of claim 1, wherein said fibers have a denier of from about 1100 to about 1600.

15. The composite material of claim 1, wherein said composite has a Peel Strength of less than about 1.0 pounds (0.45 kg) for a two layer structure of said composite, and less than about 0.7 pounds (0.32 kg) for a four layer structure of said composite.

16. The composite material of claim 1, wherein said composite has a Peel Strength of less than about 0.9 pounds (0.41 kg) for a two layer structure of said composite, and less than about 0.6 pounds (0.27 kg) for a four layer structure of said composite.

17. The composite material of claim 1, wherein said composite has a stiffness of less than about 2.0 pounds (0.91 kg) for a two layer structure of said composite, and a stiffness of less than about 2.8 pounds (1.27 kg) for a four layer structure of said composite.

18. The composite material of claim 1, wherein the total areal density is from about 75 to about 100 g/m² for a two layer structure of said composite, and from about 140 to about 190 g/m² for a four layer structure of said composite.

19. The composite material of claim 18 wherein said total areal density is about 97 g/m² for a two layer structure of said composite.

20. An article formed from the composite material of claim 1.

21. A flexible ballistic resistant composite material having improved flexibility, said composite material comprising a plurality of non-woven fibrous layers, said fibrous layers comprising a network of high tenacity poly(alpha-olefin) fibers having a tenacity of at least about 35 g/d and a tensile modulus of at least about 1200 g/d, said fibers being in a matrix comprising a block copolymer of a conjugated diene and a vinyl aromatic monomer deposited on said fibers as an aqueous composition comprising a viscosity modifier, said composite having a total areal density equal to or less than about 100 g/m² and a stiffness of less than about 2.5 pounds (1.14 kg) for a two layer structure of said composite, and a total areal density equal to or less than about 190 g/m² and a stiffness of less than about 3.0 pounds (1.36 kg) for a four layer structure of said composite.

22. The composite material of claim 21, wherein said block copolymer comprises a styrene-isoprene-styrene block copolymer.

23. The composite material of claim 22, wherein said fibers in said fibrous layers comprise extended chain polyethylene fibers.

24. A flexible ballistic resistant composite material having improved flexibility, said composite material comprising a plurality of non-woven fibrous layers, said fibrous layers comprising a network of high tenacity poly(alpha-olefin) fibers having a tenacity of at least about 35 g/d and a tensile modulus of at least about 1200 g/d, said fibers being in a matrix comprising a block copolymer of a conjugated diene and a vinyl aromatic monomer deposited on said fibers as an aqueous composition, said composite having a total areal density equal to or less than about 100 g/m² and a stiffness of less than about 2.5 pounds (1.14 kg) for a two layer structure of said composite, and a total areal density equal to or less than about 190 g/m² and a stiffness of less than about 3.0 pounds (1.36 kg) for a four layer structure of said composite, whereby when assembled together a plurality of said composites meets at least one of the following ballistic criteria:
  (a) for a total weight of 0.75 pounds per square foot (3.68 kg/m²) when impacted with a 9 mm full metal jacket bullet:
    (i) for a plurality of said composites comprising two layer structures of said composite, a V50 of at least about 1600 fps (488 mps), and
    (ii) for a plurality of said composites comprising four layer structures of said composite, a V50 of at least about 1700 fps (519 mps);
  (b) for a total weight of 0.75 pounds per square foot (3.68 kg/m²) when impacted with a 44 magnum bullet:
    (iii) for a plurality of said composites comprising two layer structures of said composite, a V50 of at least about 1500 fps (458 mps), and
    (iv) for a plurality of said composites comprising four layer structures of said composite, a V50 of at least about 1550 fps (473 mps); and
  (c) for a total weight of 1.00 pounds per square foot (4.90 kg/m²) when impacted with a 17 grain Fragment Simulating Projectile meeting the specifications of MIL-P-46593A (ORD):
    (v) for a plurality of said composites comprising two layer structures of said composite, a V50 of at least about 1825 fps (556 mps), and
    (vi) for a plurality of said composites comprising four layer structures of said composite, a V50 of at least about 1875 fps (572 mps).

25. The composite material of claim 24, wherein said plurality of said composites meets all of the stated ballistic criteria.

26. The composite material of claim 24, wherein said block copolymer comprises a styrene-isoprene-styrene block copolymer, and said fibers in said fibrous layers comprise extended chain polyethylene fibers.

27. An article formed from a plurality of layers of the composite material of claim 26.

28. A flexible ballistic resistant armor product comprising a plurality of layers of a flexible composite material, said composite material comprising a network of high tenacity poly(alpha-olefin) fibers having a tenacity of at least about 35 g/d and a tensile modulus of at least about 1200 g/d, said fibers being in a matrix comprising a block copolymer of a conjugated diene and a vinyl aromatic monomer deposited on said fibers as an aqueous composition, said composite having a total areal density equal to or less than about 100 g/m2 and a stiffness of less than about 2.5 pounds (1.14 kg) for a two layer structure of said composite, and a total areal density equal to or less than about 190 g/m² and a stiffness of less than about 3.0 pounds (1.36 kg) for a four layer structure of said composite.

29. The armor product of claim 28, wherein said block copolymer comprises a styrene-isoprene-styrene block copolymer, and said fibers in said fibrous layers comprise extended chain polyethylene fibers.

30. A method for the manufacture of a flexible ballistic resistant composite material that has improved flexibility, said method comprising providing a first non-woven fibrous layer comprising a network of high tenacity poly(alpha-olefin) fibers having a tenacity of at least about 35 g/d and a tensile modulus of at least about 1200 g/d; coating said first fibrous layer with an aqueous composition of a block copolymer of a conjugated diene and a vinyl aromatic monomer; providing a second non-woven fibrous layer comprising a network of said high tenacity poly(alpha-olefin) fibers; coating said second fibrous layer with an aqueous composition of a block copolymer of a conjugated diene and a vinyl aromatic monomer; evaporating water from said first and second fibrous layers, and consolidating said first and second fibrous layers to form a composite material having a total areal density equal to or less than about 100 g/m² and a stiffness of less than about 2.5 pounds (1.14 kg) for a two layer structure of said composite, and total areal density equal to or less than about 190 g/m² and a stiffness of less than about 3.0 pounds (1.36 kg) for a four layer structure of said composite.

31. The method of claim 30, wherein said composite has a Peel Strength for a two layer structure of less than about 1.0 pounds (0.45 kg) for a two layer structure of said composite, and less than about 0.7 pounds (0.32 kg) for a four layer structure of said composite.

32. The method of claim 30, wherein said aqueous composition coating said first and second fibrous layers comprises a dispersion of a styrene-isoprene-styrene block copolymer, and said fibers in said first and second fibrous layers comprise extended chain polyethylene fibers.

33. The method of claim 32, wherein said first and second fibrous layers have said fibers arranged unidirectionally in each fibrous layer, and including the step of cross-plying said fibrous layers such that the direction of fibers in adjacent layers is at angles with respect to each other.

* * * * *